(No Model.) 2 Sheets—Sheet 1.

P. THIELEN.
LAWN MOWER.

No. 439,026. Patented Oct. 21, 1890.

WITNESSES:
H. C. Johnson
A. A. Higdon

INVENTOR
P. Thielen
BY J. C. Higdon
his ATTORNEY.

(No Model.) 2 Sheets—Sheet 2.
P. THIELEN.
LAWN MOWER.
No. 439,026. Patented Oct. 21, 1890.
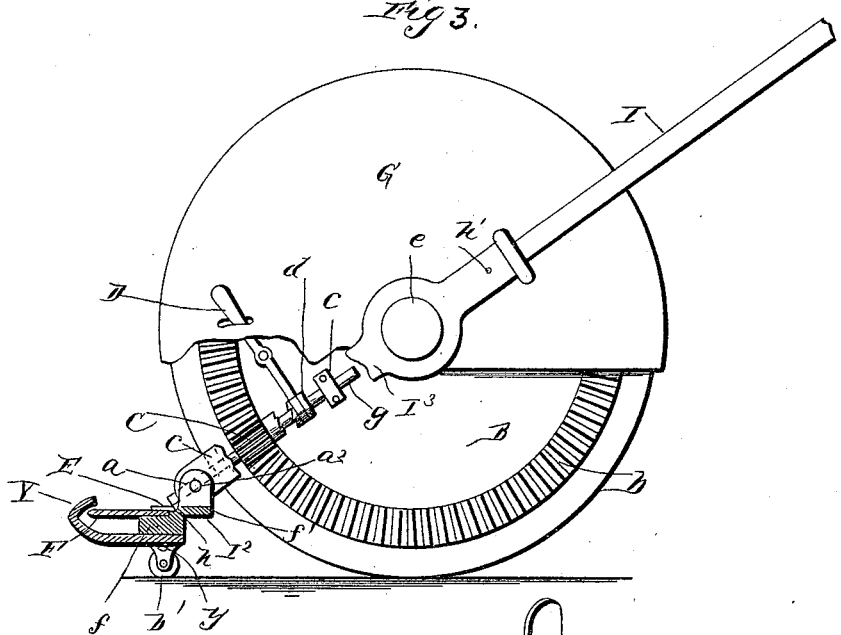
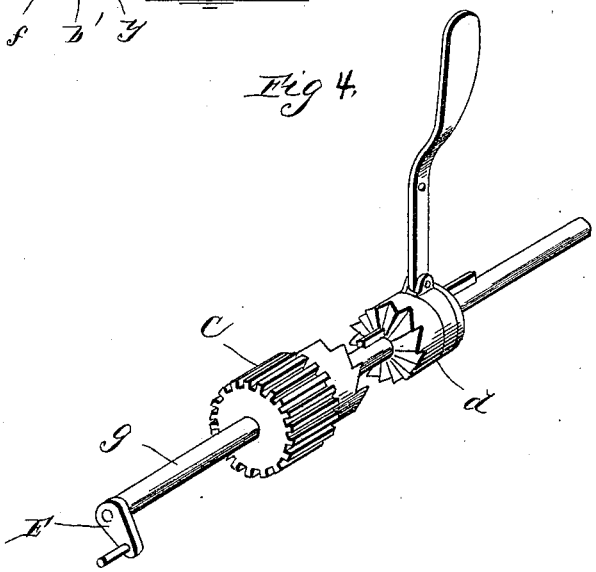
Witnesses:
O. L. Taylor
H. E. Johnson
Inventor:
Paul Thielen,
By his Attorney J. C. Higdon

UNITED STATES PATENT OFFICE.

PAUL THIELEN, OF KANSAS CITY, KANSAS, ASSIGNOR OF ONE-HALF TO JAMES J. SHEA, OF SAME PLACE.

LAWN-MOWER.

SPECIFICATION forming part of Letters Patent No. 439,026, dated October 21, 1890.

Application filed May 31, 1889. Serial No. 312,842. (No model.)

*To all whom it may concern:*

Be it known that I, PAUL THIELEN, of Kansas City, Wyandotte county, Kansas, have invented certain new and useful Improvements in Lawn-Mowers, of which the following is a full, clear, and exact description, reference being had to the accompanying drawings, forming a part hereof.

This invention relates to certain improvements in lawn-mowers, having for its object, among other things, to provide a light-running and durable lawn - mowing machine which shall be adapted to cut the grass closely to the ground and snugly and close up to the shrubbery or ornamental trees standing in the inclosure; and to these ends the nature of the invention consists of the novel construction and combination of parts, as will fully appear from the following description and accompanying illustrations, in which—

Figure 1:
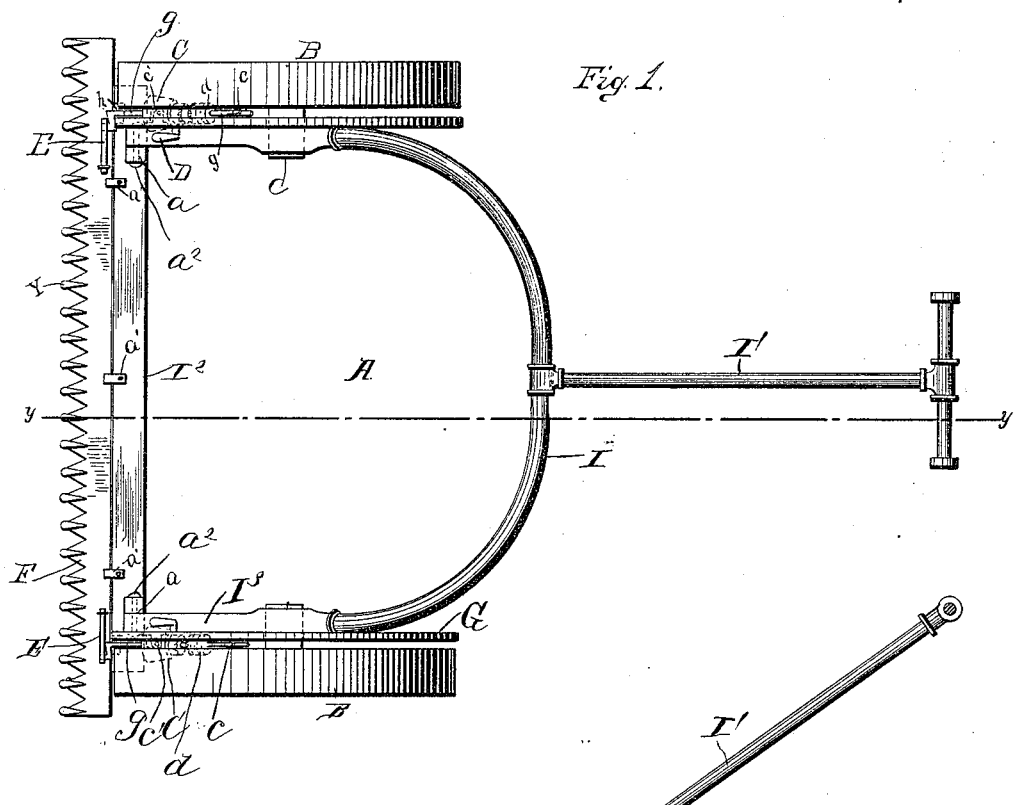
Figure 2:
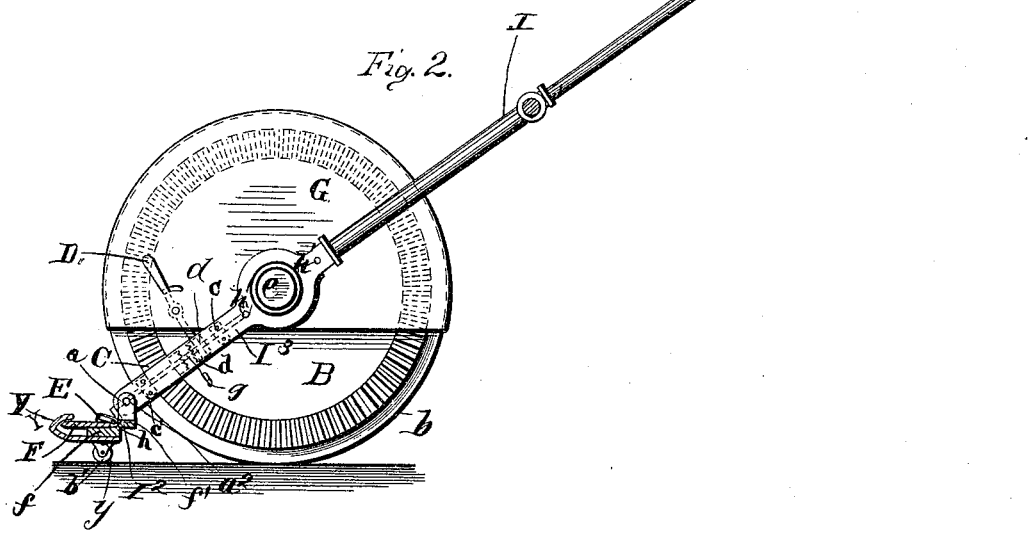

Figure 1 is a plan view of my improved lawn-mower. Fig. 2 is a sectional elevation on the line $y\ y$ of Fig. 1. Fig. 3 is also a sectional view on the line $y\ y$ of Fig. 1 with parts broken away, and Fig. 4 is a detail view of the operating mechanism and clutches.

In the embodiment of my invention I provide a frame I, preferably of the form shown, presenting a bail of proximately U shape, and connect centrally thereto a handle I' of usual form. The lower diverging ends of the frame or bail I are pivotally connected to a stepped cross-bar or shoe I², the latter having upon its upper side, near the ends, vertical lugs $a\ a$, through apertures in which and in the said ends of the frame or bail are inserted pivot-bolts $a^2$. The curved portion of the frame or bail I, together with its handle I', is or may be cylindric in cross-section; but the arms proper I³ thereof are preferably rectangular in cross-section, except near the upper ends of said arms, where they are circular.

B B are the carrying or transporting wheels, whose axles or shafts $e\ e$ are borne in the circular portions of the arms I³ of the bail or frame I, said circular portions having apertures which receive and in which are held said axles.

F is the cutter-bar, which is seated or supported upon the lower ledge or step $f$ of the stepped cross-bar or shoe I², its rear or back edge resting or abutting against the forward edge of the upper ledge or step $f'$ of said bar or shoe I². To hold the cutter-bar F from vertical displacement at its rear edge, button-like lugs $a'\ a'$ are applied or secured to the cross-bar I² to project over and rest upon said cutter-bar at the required intervals at that point.

Y are the fingers, which are fastened or bolted, as at $y$, to the under side of the ledge or step $f$ of the cross-bar or shoe I² and curve upward and inward and overhang the cutter-bar F at its forward edge, said fingers projecting a short distance inward from said edge of the cutter-bar, thus aiding to prevent the outward or forward displacement of the cutter-bar.

$g\ g$ are crank-shafts—one applied at each side of the frame or bail I and which are journaled or supported in bearings $c\ c'$—two arranged upon the outer sides of the arms I³ of the bail or frame I. The forward ends of the cranks or arms of the shafts $g\ g$ work in apertures in the outer ends of and actuate links or pitmen E, in turn connected to the cutter-bar F, whereby when the crank-shafts are rotated (being geared, as presently described, to the carrying-wheels) the cutter-bar will be actuated or reciprocated. The shoe or bar I² is cut away, as at $h$, to provide for the requisite movement of the cranks of the shafts $g$. The shafts $g\ g$ have secured thereto beveled or conical pinions C, which gear with circular series of radial cogs $b$ upon the inner sides of the carrying-wheels B near their peripheries, for the purpose aforesaid. The upper or outer ends of the pinions C are provided with clutch-faces, and upon the same shafts $g\ g$ with the pinions C are arranged sliding clutch-faced sleeves $d$, adapted for engagement with and disengagement from the clutch-faces of the pinions C. The movement of the sleeves $d$, whereby this is secured, is effected by means of hand-levers D, pivoted to the wheel-guards (presently referred to) and connected to said sleeves and adapted for convenient manipulation by the hand, the purpose of which, it is obvious, is to throw the cutter-bar into and out of operation, as may be desired.

G G are guards or plates, which are somewhat more in area than half the circles of the wheels B, and which are bolted to the arms I³ of the frame or bail I, as at $h'$ $h'$, contiguously to the wheels, to prevent obstructions or foreign substances getting into and clogging the cogs $b$ of said wheels. These guards or plates are provided with openings for the passage through them of the shafts or axles of the wheels B, as also the handled portions or ends of the levers D to the inner or opposite sides of the guards, for greater convenience of operation, said handled portions being offset from the main or body portions of the lever.

$b'$ $b'$ are caster wheels or rollers, which are suitably applied to the under side of the bar or shoe I² of the frame or bail I, thus permitting of supporting the cutter-bar at a slight height above the ground, whereby it is apparent that the cutter can be run under shrubbery, as also under ornamental trees, and effect the snug or neat cutting of the grass not only under them, but also close up to the bases thereof, as is greatly desired.

It will be observed that portions of the frame, including the handle of my machine, may be and are preferably made of hollow metal—as, for instance, gas-pipe and the like—while the other portion thereof is preferably made of flat bar-iron.

In my machine all the actuating mechanism is arranged between the driving-wheels and the guards, which are arranged parallel with said wheels, and, therefore, said mechanism is protected from injury by obstructions. The guards are secured permanently to the yoke-shaped frame on the inside of the wheel and are adjacent thereto.

Having thus fully described my invention, what I claim as new, and desire to secure by Letters Patent, is—

In a lawn-mower, the combination, with a frame carrying driving-wheels having gear-teeth on their inner surfaces, of the vertical guard-plates secured to the frame close to the inner surfaces of said driving-wheels, the cutter-bar, the crank-shafts mounted in bearings on the outer surfaces of the guard-plates, connected to the cutter-bar, and provided with clutch-faced pinions which mesh with the gear-teeth on the driving-wheels, and the sliding clutches engaging said pinions, substantially as specified.

In testimony whereof I affix my signature in presence of two witnesses.

PAUL THIELEN.

Witnesses:
 F. G. FISCHER,
 A. A. HIGDON.